(No Model.)
E. G. SHREVE.
CAR STALL FOR HORSES.
No. 420,111. Patented Jan. 28, 1890.
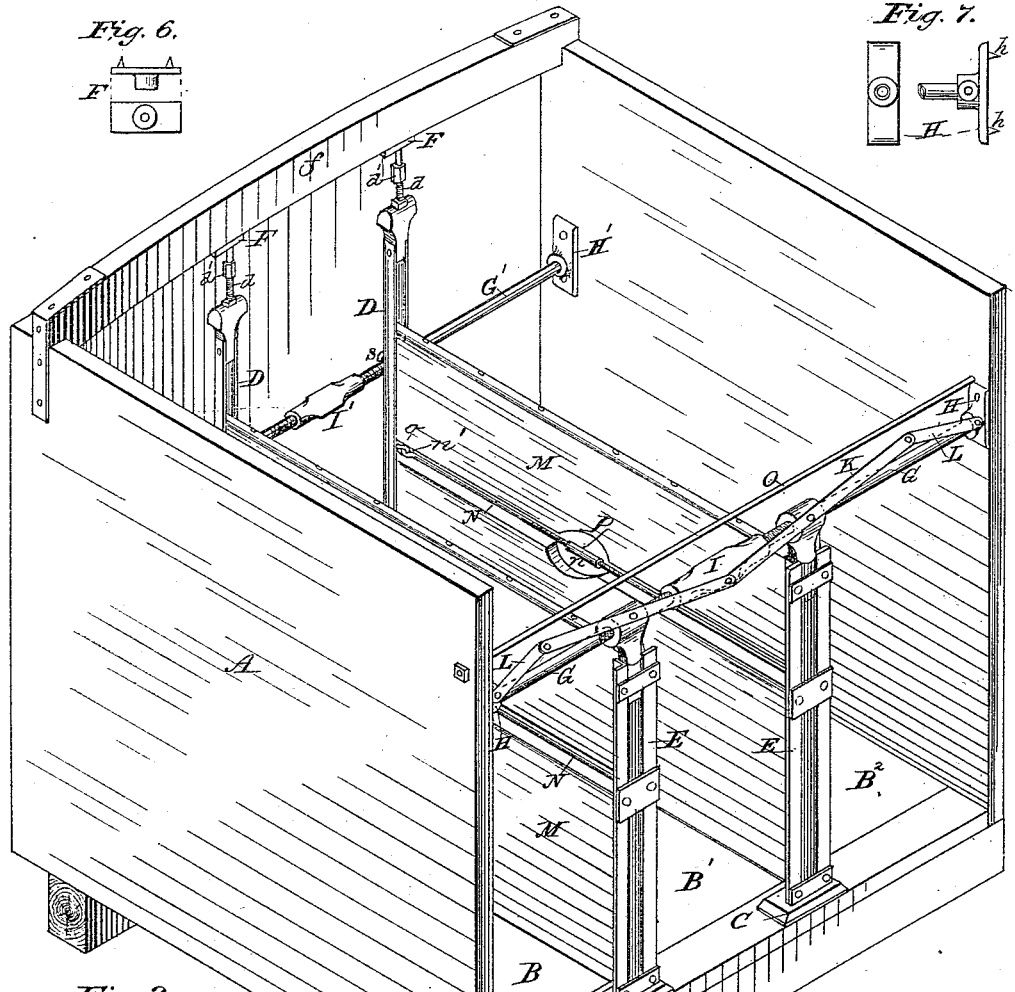
Witnesses:
H. J. Ashton
N. B. Brecht
Inventor:
Ephraim G. Shreve
By T. C. Brecht
Attorney.
N. PETERS, Photo-Lithographer, Washington, D. C.

UNITED STATES PATENT OFFICE.

EPHRAIM G. SHREVE, OF LONG BRANCH, NEW JERSEY.

CAR-STALL FOR HORSES.

SPECIFICATION forming part of Letters Patent No. 420,111, dated January 28, 1890.

Application filed February 20, 1889. Serial No. 300,613. (No model.)

*To all whom it may concern:*

Be it known that I, EPHRAIM G. SHREVE, a citizen of the United States, residing at Long Branch, in the county of Monmouth and State of New Jersey, have invented certain new and useful Improvements in Portable Universal Car-Stalls for Horses, Cattle, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in portable universal car-stalls for horses, cattle, &c.; and the object is to produce a car-stall that can be easily and quickly applied and detached from freight-cars of the ordinary construction for the transportation of horses, cattle, &c.; also, to construct the parts in such manner that they are easily adjusted to cars of different sizes and heights; also, to produce the devices so that they can be transported in a very small compass, and so that the stalls can be applied to the cars for the transportation of horses, &c., in one direction, and that they can be readily detached for the transportation of freight in the other direction, and, finally, to produce the different parts of substantial material and yet light and strong.

With these objects in view my invention consists in the construction of certain details and arrangement of parts, as will be more fully described hereinafter, and specifically pointed out in the claims, reference being had to the accompanying drawings and the letters of reference marked thereon.

Like letters indicate similar parts in the different figures of the drawings, in which—

Figure 1 represents a perspective view of part of a car, showing three stalls in position. Fig. 2 represents the base-plate for the uprights on an enlarged scale. Fig. 3 are detail views of the uprights for the rear ends of the car. Fig. 4 are similar views of the uprights toward the middle of the cars. Fig. 4ª is a clamping-screw. Fig. 5 is a modification of Fig. 4. Figs. 6 and 7 are detail views of brace and upright plates.

In the drawings, A represents part of the body of an ordinary freight-car to which the stalls B B' B² (more or less, according to size of car) are applied. These stalls are formed in the following manner: The base-plates C are first applied to the floor either by the pins $c$ or permanently by wood-screws $c'$, and are provided with the recesses $d$, into which the uprights D at one end or the uprights E at the other end are placed. The uprights are made of sheet metal, angle, T, or channel iron; or they may be made of wood or other material, although I prefer metal. The uprights D are provided at their upper ends with adjusting-screws $d$, which bear against detachable or permanent plates F on the girder $f$ of the car. The screws $d$ are adjusted by the square or hexagonal part $d'$, to which a wrench can be applied. The uprights E are provided at their upper ends with heads $e$, which may be permanently secured to them, as shown in Fig. 4; or they may be made adjustable, as in Fig. 5, or in any other suitable manner. A brace G, formed of a tube or rod, passes through the eyes formed in said heads and extends toward the sides of the car, where it is provided with shoe-plates H, having pins or points $h$, to prevent them from turning. The brace G is made in two parts, entering into the opposite ends of turn-buckle I, provided with right and left hand threads for adjusting the brace in position. To the heads $e$ the bars K are secured, being pivoted together at their centers, and at their outer ends they are pivoted to the short bars L, which are pivoted at their outer ends to the plates H, bearing against the sides of the car. The bars K and L thus form a toggle-joint, and when the turn-buckle is acted on they exert their pressure or force and form pressure-supports. At the rear end of the car a similar brace G', with turn-buckle I', may be applied and be provided with the plates H'; but in this case the toggle-bars may be dispensed with. About the central parts of the uprights D clamping-screws $s$ are applied to secure the brace and uprights together. The brace must be provided with slots, through which said screws $s$ pass and permit the expanding or contracting of said brace. The partitions M consist of an upper and lower part, that fit into the spaces formed in the uprights, and a brace-rod N, provided with turn-buckle n, serves to hold the rear and front uprights together and prevents them from bulging outward. The upper edges of the partitions are preferably lined with metal, to prevent the horses, &c., from gnawing them. The brace-rod N is provided at each end with a hook $n'$, which engage with eyes o, secured in the uprights D and E, and an opening p is made in the partitions to facilitate access to the turn-buckle for adjusting the brace-rod. A brace-rod O serves to hold the sides of the car together and prevents them from spreading apart when the stalls are applied in place.

Having thus described my invention, what I claim is—

1. A portable universal car-stall for horses, &c., consisting of uprights D, supported by adjusting-screws, and uprights E, supported by braces G and by base-plates, in combination with partitions supported in said uprights and having adjustable brace-rods, arranged as shown, and for the purpose specified.

2. A portable universal car-stall for horses, &c., consisting of adjustable uprights and braces with turn-buckles, the partitions, and brace-rods supported in said uprights, in combination with the toggle-bars and base-plates, all arranged to be readily attached and detached, as and for the purpose herein set forth.

3. In an adjustable universal car-stall for horses, &c., the braces having turn-buckles and shoe-plates, in combination with the toggle-bars connected to the uprights and said shoe-plates, as shown and described.

4. In a removable universal car-stall for horses, &c., the uprights supported on base-plates at their lower ends and provided with heads having eyes through which the braces pass, in combination with uprights supported on base-plates and on adjusting-screws, and the partitions, all arranged as and for the purpose specified.

5. The removable stall for animals, consisting of the adjustable uprights D and E, the adjustable braces G, having turn-buckles and shoe-plates, and the toggle-bars, in combination with the partitions and adjustable brace-rods, all arranged as and for the purposes specified.

In testimony whereof I affix my signature in presence of two witnesses.

EPHRAIM G. SHREVE.

Witnesses:
T. C. BRECHT,
GEO. W. LINKINS.